(12) United States Patent
Wilkes et al.

(10) Patent No.: US 8,396,792 B1
(45) Date of Patent: *Mar. 12, 2013

(54) DYNAMICALLY SPECIFYING A MERCHANT IDENTIFIER IN AN ELECTRONIC FINANCIAL TRANSACTION

(75) Inventors: W. Bradley Wilkes, Alpine, UT (US); Dan Roper, Provo, UT (US)

(73) Assignee: Propay USA. Inc., Orem, UT (US)

( * ) Notice: Subject to any disclaimer, the term of this patent is extended or adjusted under 35 U.S.C. 154(b) by 1029 days.

This patent is subject to a terminal disclaimer.

(21) Appl. No.: 10/660,147

(22) Filed: Sep. 10, 2003

(51) Int. Cl.
G06Q 40/00 (2006.01)

(52) U.S. Cl. ............................................. 705/39; 705/35

(58) Field of Classification Search .................... 705/35, 705/39
See application file for complete search history.

(56) References Cited

U.S. PATENT DOCUMENTS

| | | | |
|---|---|---|---|
| 5,963,625 A | 10/1999 | Kawecki et al. | |
| 6,018,717 A | 1/2000 | Lee et al. | |
| 6,169,974 B1 | 1/2001 | Baumgartner et al. | |
| 6,226,624 B1 | 5/2001 | Watson et al. | |
| 6,490,568 B1 | 12/2002 | O'Mara et al. | |
| 6,529,880 B1 | 3/2003 | McKeen et al. | |
| 6,721,716 B1* | 4/2004 | Gross | 705/40 |
| 7,104,443 B1 | 9/2006 | Paul et al. | |
| 7,184,980 B2* | 2/2007 | Allen-Rouman et al. | 705/35 |
| 2001/0016835 A1 | 8/2001 | Hansmann et al. | |
| 2002/0004772 A1* | 1/2002 | Templeton et al. | 705/35 |
| 2002/0010640 A1 | 1/2002 | Dutta et al. | |
| 2002/0169720 A1 | 11/2002 | Wilson et al. | |
| 2002/0181710 A1 | 12/2002 | Adam et al. | |
| 2003/0004827 A1 | 1/2003 | Wang | |
| 2003/0028495 A1* | 2/2003 | Pallante | 705/78 |
| 2003/0093703 A1 | 5/2003 | Oliver et al. | |
| 2003/0097303 A1 | 5/2003 | Agee et al. | |
| 2003/0140007 A1 | 7/2003 | Kramer et al. | |
| 2003/0158844 A1* | 8/2003 | Kramer et al. | 707/6 |
| 2003/0191945 A1 | 10/2003 | Keech | |
| 2003/0235184 A1 | 12/2003 | Dorenbosch et al. | |
| 2004/0024700 A1 | 2/2004 | Petigny | |
| 2004/0030647 A1* | 2/2004 | Hansen et al. | 705/40 |
| 2004/0048658 A1 | 3/2004 | Sanders | |
| 2004/0054622 A1* | 3/2004 | Strayer et al. | 705/39 |
| 2004/0078276 A1* | 4/2004 | Shimogori | 705/26 |
| 2004/0111343 A1* | 6/2004 | Lindvall et al. | 705/35 |

(Continued)

FOREIGN PATENT DOCUMENTS

| | | |
|---|---|---|
| WO | WO00/67216 | 11/2000 |
| WO | WO02/45278 | 6/2002 |

OTHER PUBLICATIONS

Webcommerce Help Guide, www.webcom.com; online Dec. 26, 2002.

(Continued)

*Primary Examiner* — Hani M Kazimi
*Assistant Examiner* — Hatem M Ali
(74) *Attorney, Agent, or Firm* — Brooks Kushman P.C.

(57) ABSTRACT

In a system where a merchant conducts transactions on behalf of more than one entity, a method is provided for dynamically selecting a merchant account name. A merchant acting on behalf of a business entity conducts a transaction with a cardholder. An acquirer receives information for processing the financial card transaction. The acquirer generates a merchant account name that identifies the entity for which the merchant is conducting the transaction. The merchant account name is specified based on transmittal information and the merchant account name is associated with the transaction.

27 Claims, 4 Drawing Sheets

U.S. PATENT DOCUMENTS

| | | |
|---|---|---|
| 2004/0127256 A1 | 7/2004 | Goldwaite et al. |
| 2004/0153399 A1 | 8/2004 | Wilkes |
| 2004/0153410 A1 | 8/2004 | Nootebos et al. |
| 2005/0097015 A1 | 5/2005 | Wilkes et al. |
| 2005/0246253 A1 | 11/2005 | Barthelemy |
| 2006/0116955 A1 | 6/2006 | Strayer et al. |
| 2007/0005496 A1 | 1/2007 | Cataline et al. |

OTHER PUBLICATIONS

Office Action mailed Jan. 11, 2008 for U.S. Appl. No. 10/358,751.
U.S. Appl. No. 10/358,751, filed Feb. 5, 2003, Wilkes.
U.S. Appl. No. 10/358,751, Nov. 6, 2008, Office Action.
U.S. Appl. No. 10/358,751, Jul. 23, 2008, Office Action.
U.S. Appl. No. 10/358,751, Jan. 11, 2008, Office Action.
Non-Final Office Action dated Jan. 11, 2008, for U.S. Appl. No. 10/358,751, filed Feb. 5, 2003, 13 pgs.
Response to Non-Final Office Action dated Apr. 16, 2008, for U.S. Appl. No. 10/358,751, filed Feb. 5, 2003, 15 pgs.
Final Office Action dated Jul. 23, 2008, for U.S. Appl. No. 10/358,751, filed Feb. 5, 2003, 15 pgs.
Response to Final Office Action dated Sep. 3, 2008, for U.S. Appl. No. 10/358,751, filed Feb. 5, 2003, 14 pgs.
Non-Final Office Action dated Nov. 6, 2008, for U.S. Appl. No. 10/358,751, filed Feb. 5, 2003, 15 pgs.
Response to Non-Final Office Action dated Feb. 6, 2009, for U.S. Appl. No. 10/358,751, filed Feb. 5, 2003, 15 pgs.
Non-Final Office Action dated May 11, 2009, for U.S. Appl. No. 10/358,751, filed Feb. 5, 2003, 15 pgs.
Pre-Appeal Brief Request for Review dated Oct. 2, 2009, for U.S. Appl. No. 10/358,751, filed Feb. 5, 2003, 5 pgs.
Non-Final Office Action dated Mar. 17, 2010, for U.S. Appl. No. 10/358,751, filed Feb. 5, 2003, 6 pgs.
Response to Non-Final Office Action dated Apr. 23, 2010, for U.S. Appl. No. 10/358,751, filed Feb. 5, 2003, 11 pgs.
Non Final Office Action dated Jul. 24, 2008, for U.S. Appl. No. 10/697,374, filed Oct. 30, 2003, 16 pgs.
Response to Non-Final Office Action dated Sep. 13, 2008, for U.S. Appl. No. 10/697,374, filed Oct. 30, 2003, 13 pgs.
Final Office Action dated Dec. 30, 2008, for U.S. Appl. No. 10/697,374, filed Oct. 30, 2003, 10 pgs.
Response to Final Office Action dated Mar. 19, 2009, for U.S. Appl. No. 10/697,374, filed Oct. 30, 2003, 9 pgs.
Non-Final Office Action dated Jun. 9, 2009, for U.S. Appl. No. 10/697,374, filed Oct. 30, 2003, 6 pgs.
Response to Non-Final Office Action dated Oct. 6, 2009, for U.S. Appl. No. 10/697,374, filed Oct. 30, 2003, 11 pgs.
Final Office Action dated Jan. 5, 2010, for U.S. Appl. No. 10/697,374, filed Oct. 30, 2003, 15 pgs.
Upkar Varshney et al. Mobile Commerce: Framework, Applications and Networking Support, Mobile Networks and Applications, vol. 7, 2002, pp. 185-198.
TakePayment.com(as of Feb. 3, 2003) http://web.archive.org/web/20030202013748/http://takepayment.com, retrieved Sep. 29, 2009.
U.S. Appl. No. 10/358,751, Mail Date May 11, 2009, Office Action.

\* cited by examiner

DYNAMICALLY SPECIFYING A MERCHANT IDENTIFIER IN AN ELECTRONIC FINANCIAL TRANSACTION

BACKGROUND OF THE INVENTION

1. The Field of the Invention

The present invention relates to systems and methods for dynamically specifying a pertinent name associated with a merchant account. More particularly, the present invention relates to systems and methods for determining the identity of a business entity in a financial transaction based on the transmittal information conveyed during the transmission of the transaction information.

2. Background and Related Art

Financial cards come in a variety of different types from traditional credit cards and debit cards to stored value cards. Issuers and acquirers that are members of an association or jointly owned corporation make it possible for these types of financial cards to be used to make payments. The association is an entity that administers and promotes financial cards. Some associations promote one or more brands of financial cards. Issuers are usually financial institutions that issue cards to individuals or entities (businesses) that thereby become cardholders. Acquirers maintain relationships with merchants that enable the merchants to accept financial cards from cardholders.

Today, using a financial card in a transaction requires a person to establish a relationship with an issuer and become a cardholder. Becoming a cardholder is a process that is well known to a large number of people and many people receive solicitations to become cardholders almost every day. Generally, a person completes a simple application and provides the completed application to an issuer. In the case of an application for a credit card, the issuer examines the credit of the applicant, establishes a credit limit, and issues a card to the person. After the cardholder receives his or her card from the issuer, the cardholder can use his or her card to purchase goods and/or services as long as the merchant accepts that particular card.

After people become cardholders, they are able to use their cards in financial transactions to make payment. While people are able to use their cards to purchase goods/services, they are unable to accept cards as payment in similar transactions. The ability to accept cards as payment requires the person accepting the card to have a merchant account with an acquiring financial institution. Unfortunately, merchant accounts are only available to businesses that become merchants as defined by the association. To accept cards and become a merchant, the business must establish a relationship with an acquirer that enables the business to accept cards in the business's transactions. This is primarily accomplished through a merchant account that the acquirer establishes for the business that qualifies as a merchant.

To obtain a merchant account with an acquirer and become a merchant, the business is often asked to provide details regarding their business practices. The business is often required to describe the goods and services being sold as well as how the goods and services are delivered to customers. With this information, the acquirer assists the business to identify a card processing system that best serves the needs of the business.

One feature of a card processing system is to identify the business involved in each financial card transaction. Generally, the business can be identified by the name of the merchant account. The business is identified by associating the name on the merchant account with a particular transaction. Transaction data gathered and sent during a card transaction contains information identifying the merchant account to be credited.

The issuer also uses the name of the merchant account. When the issuer collects payment from the cardholder, the issuer provides the cardholder with a statement. The statement itemizes the cardholder's transactions and provides the name of the merchant account where payment was made. Providing the cardholder with the merchant account name for each transaction facilitates the financial card system because it helps the cardholder verify that the listed transactions are valid transactions and reduces the risk of fraud or error.

Some merchants, however, conduct business for more than one business entity. This type of business structure is common with businesses where the merchant is an individual sales representative who visits customers in their home or somewhere other than a business establishment. Since these merchants do not have an established place of business, these merchants have the liberty of acting on behalf of more than one business entity or for themselves.

In general, conventional merchant accounts are associated with only one merchant name. Merchants that enter into transactions on behalf of multiple business entities find it difficult for financial entities to provide a single merchant account name for a single merchant account. Since the merchant is involved in each transaction, regardless of which business entity they are acting on behalf of, the merchant name includes the name of the individual merchant. However, the business entity's name is usually more familiar to a purchaser than the merchant's name. Therefore, it is beneficial to include the business name on the cardholder's statement. Unfortunately, merchant accounts are not able to be associated with more than one merchant name or doing business as name.

For the merchant account to include the correct name of the business entity, multiple accounts must be established or the merchant account name must be specified. Having multiple accounts is undesirable because it requires additional work to underwrite and maintain the account. It is also economically prohibitive to have more than one account because of the associated fees and costs. Minimum fees, for example, are often charged whether the merchant account is used. While in some cases the merchant may be able to specify the correct business entity, relying on the merchant to specify the correct merchant account name creates the potential for error. The merchant may forget to include the business entity name or may specify the wrong name.

This problem is also evident in Point of Sale (POS) terminals. Some POS terminals have the ability to be configured for multiple merchant accounts. They do not, however, contemplate multiple merchant names for a particular merchant account. POS terminals in, for example, medical offices, are often used with multiple merchant accounts even though there is a single medical office.

BRIEF SUMMARY OF THE INVENTION

These and other limitations are overcome by the present invention which relates to systems and methods for dynamically specifying a merchant account in an electronic financial transaction. In most transactions, as previously stated, the merchant account is specified by a Merchant ID and the relationship between merchant accounts and merchant names is one-to-one. Embodiments of the present invention enable a financial entity, such as an acquirer/issuer, to determine the correct merchant account name to associate with a transaction based on the source of the transaction.

In one embodiment, a merchant conducts business for more than one business entity. The merchant completes the transaction on a website provided by the business entity for which the merchant is conducting the transaction. To complete the transaction, the merchant enters in transaction information such as the cardholder's name, and the financial card's expiration date. The transaction information is then transmitted for processing. The transaction may be sent immediately for processing or may be pooled with other transactions for transmission purposes.

The issuer/acquirer receiving the transmission from the website is not given the identity of the business entity. Instead, the acquirer/issuer determines the proper identity of the business entity from transmittal information. In a transaction received from a website over the Internet, the acquirer/issuer determines the correct business identity by matching the interne protocol address ("IP address") with the business entity known to make transfers or conduct transaction from that IP address. It could be an IP address or another unique value that is assigned to an ISP that is responsible for forwarding transaction information on behalf of a merchant. It can be any other unique identifier, such as a unique number, a domain name, etc., that is transmitted with the transaction information. In addition, embodiments of the invention can be implemented in other networks in addition to the Internet.

A different business entity conducts transactions over a different website having a different IP address. The issuer/acquirer distinguishes the different business entity from the first business entity through the different IP address.

In another embodiment, the merchant engages in transactions on behalf of a business entity over a telephone. The merchant dials a phone number and enters in transaction information. The telephone system provided to the merchant may utilize an integrated voice recognition system (IVR). The transaction information along with the telephone number that the merchant used to conduct the transaction is conveyed to the acquirer/issuer. In this example, the merchant submitting the transaction would be provided with a list of choices and prompted for the correct merchant name to associate with the transaction. The merchant may be presented with a list of preconfigured selection options for the merchant name. A one-to-one mapping with the number that has been used to make the call can alternatively be used to identify the correct merchant name.

Upon receiving the transaction information and telephone number, the acquirer generates a merchant account name that identifies the correct business entity. The correct business entity is associated with the transaction by knowing the entity associated with the telephone number.

In yet another embodiment, a merchant account name is dynamically specified based on transmittal information. In addition, a merchant card is linked to the merchant account. The merchant card is able to accept other financial cards as payment in transactions between the merchant and the cardholder.

In another embodiment of the present invention, POS terminals can be configured to permit a merchant to select an appropriate merchant name. A merchant can swipe a cardholder's card, enter the amount of the transaction, and be prompted with a list to choose the correct merchant name to be associated with the transaction. In another embodiment, either the merchant or the cardholder can enter a note or memo that will appear in the statement. The merchant can also spontaneously select a merchant name rather than selecting a merchant name from a pre-defined list.

These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
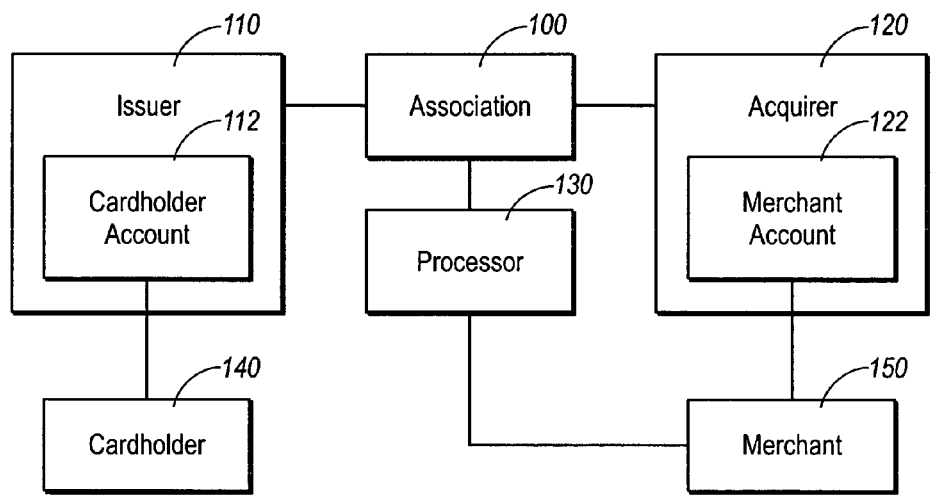
FIG. 1 illustrates an exemplary environment for implementing the present invention and illustrates relationships between cardholders, issuers, acquirers, and merchants.

The present invention relates to financial systems that perform electronic transactions in which a merchant account name can be dynamically specified. Embodiments of the present invention enable a financial entity, such as an acquirer/issuer, to determine the correct merchant account name to associate with a transaction based on the source of the transaction. Thus, merchants who conduct business for more than one business entity can cause their financial transactions to appear on customers' statements with appropriate merchant account names.

The invention is disclosed herein in reference to a financial system that permits a merchant, such as an individual or other entity, to accept financial cards from customers without requiring the merchant to have an account at a financial institution where the funds or amounts owed to the merchant can be deposited by the acquirer. An example of such a financial system is disclosed herein in reference to FIGS. 1-4. Although the methods of the invention by which merchant account names are dynamically selected can be advantageously performed in the system illustrated in FIGS. 1-4, the methods of the invention can also be practiced in any of a number of other financial systems in which a merchant can accept payment or receive funds from customers or third parties using financial cards. After the description of the financial system of FIGS. 1-4, embodiments of the invention are described below in reference to FIGS. 5 and 6.

1. Financial Systems for Linking Financial Cards with Merchant Accounts

Transactions that utilize financial cards such as credit cards and debit cards typically begin when a cardholder presents a card to a merchant. The merchant requests an authorization from the issuer of the card and completes the transaction if an authorization is not declined. This process is repeated by the merchant for each transaction. At the end of the day, the transactions of the merchant are captured. Next, the transactions are cleared and money authorized by the issuers is transferred from the Bank Identification Number (BIN) account of the issuer to the Bank Identification Number (BIN) account of the acquirer that has a relationship with the merchant. Finally, the transactions are settled and funds are delivered to the merchant less any settlement fees.

This process occurs only if the merchant has an account where the funds can be deposited by the acquirer. However, the financial system disclosed herein enables the merchant to receive the funds using a financial card that is associated with the merchant account. This financial system thus relates to systems and methods for linking a merchant account with a financial card. Funds owed to the merchant are added to an available balance of a merchant card that is linked with the merchant account. Linking a merchant account with a financial card eliminates the requirement of having the merchant maintain a checking or other account where funds can be deposited by the acquirer. Instead, the funds are made available to the merchant on the merchant card.

In one embodiment, the funds become stored value on the merchant card. Alternatively, the funds can be applied to a credit balance of the merchant card and the like. The funds can also be made available on the merchant card as soon as a transaction where the merchant receives another card as payment is authorized. Linking the merchant card to the merchant account eliminates the need to wait until the transaction has cleared and settled because the acquirer is no longer required to deposit the funds to an outside settlement account of the merchant. Instead, the acquirer can maintain the funds in the BIN account and make internal adjustments to appropriate BIN accounts in one embodiment.

Because the authorized funds are immediately available on the merchant card, the merchant can use the card, for example, at an ATM (Automatic Teller Machine) to withdraw cash using an encrypted personal identification number (PIN). The merchant is also able to use the merchant card to purchase goods/services from other merchants that accept the card. In one embodiment, the primary method of adding funds to an available balance of the merchant card is by accepting cards from other cardholders. The merchant can thereby operate a business and process financial transactions without having, for instance, a checking, savings, or other settlement account.

Linking a card to a merchant account provides other advantages. For example, only a single application and a single underwriting are required when the merchant applies for a merchant account. Upon approval, the merchant account is created and an associated card is issued to the merchant. Linking a card to a merchant account also enables the name of the merchant to be changed on a per transaction basis as is further described in reference to FIGS. 5 and 6. In addition, the merchant can accept cards from customers or other third parties by obtaining an authorization over the telephone, the Internet, wireless phone, etc. For example, the merchant typically enters the card number on the telephone after calling an authorization number. If using the Internet, the card number is usually entered in an entry box provided by the issuer for the purpose of authorizing a transaction.

Linking a merchant account with a merchant card also has the advantage of extending the benefits of a merchant account to those who traditionally have not been considered to be merchants. For example, those who offer labor for hire or are involved in informal economic activity can have merchant accounts. In addition, the present invention can be used to conveniently transfer funds electronically from one person to another person as the funds can be incorporated into an available balance of the merchant card. For instance, friends, family and other acquaintances can electronically transfer funds using the present invention.

FIG. 1 is a block diagram that illustrates an example of the various entities that are involved with financial cards and that process card transactions. The association 100 is an business, corporation, jointly owned corporation, or other entity that administers, promotes, and markets certain brands of cards. Exemplary associations include MasterCard International, Incorporated, and Visa U.S.A., Inc. The members of the associations include both issuers and acquirers. In FIG. 1, the issuers are represented by the issuer 110 and the acquirers are represented by the acquirer 120.

The issuer 110 is typically a financial institution such as a bank or an agent of a bank that has issued a financial card to a cardholder 140. The cardholder 140 can be an individual, a business, or other entity. The cardholder 140 receives a card from the issuer 110 and the name of the cardholder 140 is usually embossed on the card. The issuer 110 maintains a cardholder account 112 that reflects the status of the card given to the cardholder 140. A debit card, for example, is often associated with a checking account of the cardholder 140 while a credit card may be associated with a line of credit that has been extended to the cardholder 140 by the issuer 110.

Similarly, the acquirer 120 is also a financial institution that maintains a relationship with a merchant 150. To become a merchant, the merchant 150 establishes a merchant account 122 with the acquirer 120. The acquirer 120 receives card transactions from the merchant 150 and initiates clearing and settlement of the card transactions submitted by the merchant 150. The processor 130 provides infrastructure that enables the various entities to communicate and exchange data relevant to the card transactions that occur between cardholders and merchants. Much of the data transfer is performed by the processor 130.

Figure 2:
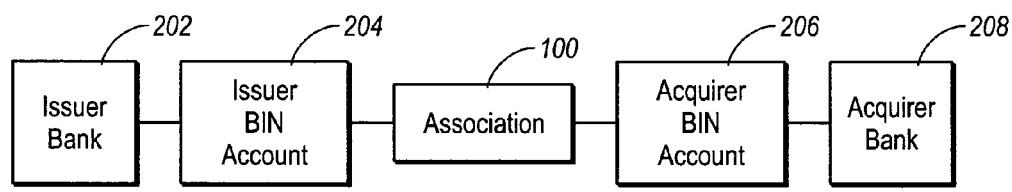
FIG. 2 is a block diagram that illustrates the use of BIN accounts and the interaction between an association and the members of the association.

FIG. 2 illustrates the relationships between issuers and acquirers in more detail. In FIG. 2, the issuer bank 202 has an issuer BIN account 204 with the association 100. Similarly, the acquirer bank 208 also has an acquirer BIN account 206 with the association 100. The BIN accounts are typically assigned by the association 100 to the members of the association, which include both issuers and acquirers. Each BIN account number identifies parts of both card numbers and/or merchant account numbers. When a cardholder initiates a transaction with a merchant and the issuer bank 202 authorizes the transaction, the issuer BIN account 204 is debited by the amount of the transaction. The issuer bank 202 is thereby responsible for the amount debited. The issuer bank 202 is reimbursed by the cardholder.

When a transaction with the cardholder is received to the acquirer bank 208, the acquirer BIN account 206 is credited with the amount of the transaction. When the issuer BIN account 204 and the acquirer BIN account 206 are cleared, funds are typically transferred from the issuer bank 202 to the acquirer bank 208. During settlement, the acquirer bank 208, as previously indicated, transfers the amount owed to the merchant to a settlement account of the merchant, less settlement fees. In this financial system, however, the funds are made available to a card of the merchant that is associated with the merchant account maintained by the acquirer bank 208. The amount owed to the merchant can thus be viewed as stored value or as an available balance. The acquirer bank 208 does not have to transfer the funds to an external settlement account, but is allowed to maintain the funds that correspond to the available balance of the card associated with the merchant account.

The BIN accounts of the members of the association are thus used to clear and settle funds. The issuer BIN account 204 and the acquirer BIN account 206 reflect the transactions that occur between cardholders and merchants. The issuer BIN account 204 indicates the sum of money that the issuer bank 202 must pay while the acquirer BIN account 206 indicates the sum of money that the acquirer bank 208 is to receive. During clearing, funds are moved from the issuer BIN account 204 to the acquirer BIN account 206. During settlement, the available balance of the merchant card is increased to reflect the funds that have been received from the issuer bank 202. Thus, the merchant is not required to have an external settlement account and the settled funds are available to the linked card in the form of an available balance or stored value in one embodiment.

Figure 3:
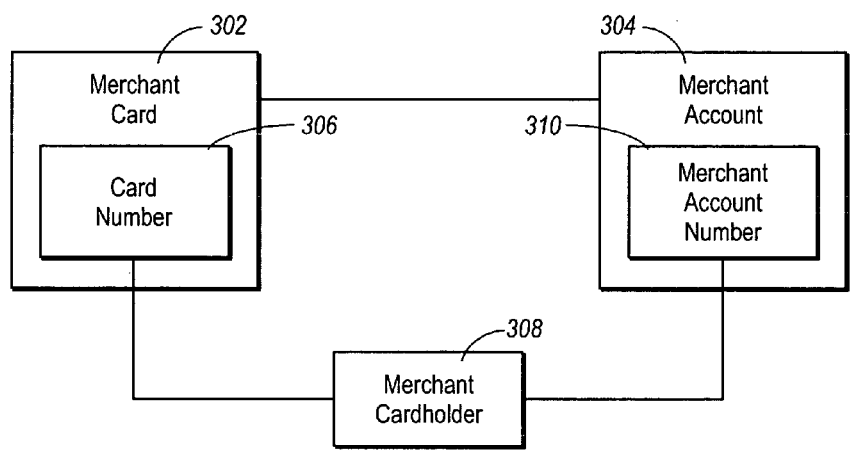
FIG. 3 illustrates a merchant account that is linked with a financial card.

FIG. 3 more fully illustrates a relationship between a merchant account 304 and a card 302. The card 302 has a card number 306 that, in this embodiment, is associated with or identifies a unique merchant account 304. The merchant account 304 also has a merchant account number 310 that is associated with or identifies a unique card 302. The merchant account 122 is assigned to the merchant cardholder 308, who also holds the card 302. Typically, the merchant cardholder 308 is a merchant as understood by the association 100 illustrated in FIG. 1. Often, a portion of the merchant number 304 is embossed on the card 302.

The merchant account 304 enables the cardholder 308 to receive funds from authorized transactions. For funds owed to the merchant, the acquirer increases the available balance of card 302 and the merchant cardholder 308 can use or access the funds represented by the available balance when using the card 302 to make payment to other merchants. The funds are typically maintained by the acquirer bank, but are included in the available balance of the card 302. When the merchant cardholder 308 uses the card 302 to purchase, the same institution that acts as an acquirer also acts as an issuer and authorizes the purchase by comparing the amount being authorized with the available balance of the card 302.

Figure 4:
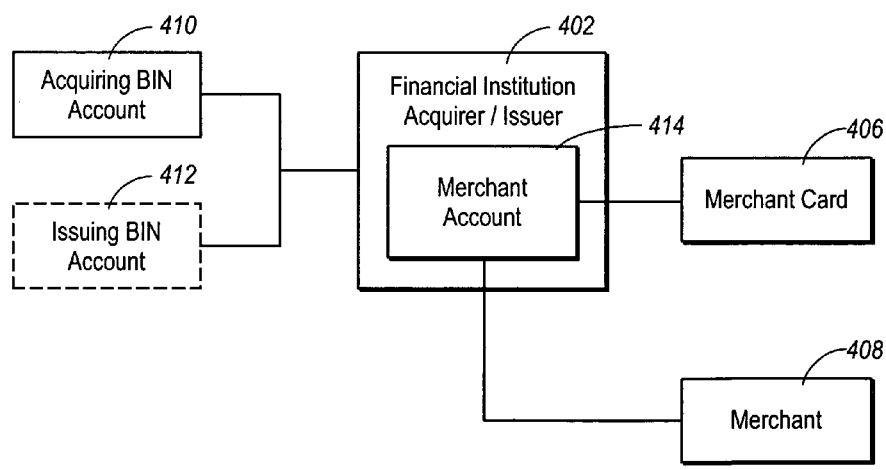
FIG. 4 illustrates a financial institution that acts as both an issuer and an acquirer for a merchant account that is linked with a financial card.

FIG. 4 is a block diagram that illustrates an example of a merchant account that is linked with a card. The financial institution 402 has issued a merchant card 406 to the merchant 408. The financial institution 402 has also established a merchant account 404 for the merchant 408 and linked the merchant account 404 to the card 406. Thus, the financial institution 402 is acting as both the issuer and the acquirer in this example.

The financial institution 402 has an acquiring BIN account 410 for the role of acquirer and an issuing BIN account 412 for the role of issuer. In one embodiment, the acquiring BIN account 410 and the issuing BIN account 412 are linked. The issuing BIN account 412 reflects authorizations that are created when the merchant 408 uses the card 402 as payment. The acquiring BIN account 410 reflects the transactions that are payable to the card 406 of the merchant 408. In other words, the acquiring BIN account 410 reflects an amount owed to the merchant and the issuing BIN account 412 reflects an amount ultimately owed by the merchant. During clearing and settlement, the issuing BIN account 412 and the acquiring BIN account 410 are simply adjusted, settlement fees are deducted, and the financial institution 402 does not have to transfer funds to an external settlement account. Rather, the settled funds, as previously described, are added to the available balance of the card 406. Thus, the BIN accounts 410 and 412 are monitored and the available balance of the card 406 adjusted as the merchant uses the card 406 to make payment and to receive payment. When the card 406 is used to receive payment, an authorized amount is added to the available balance and when the card 406 is used to make payment, the authorized amount is deducted from the available balance. In one embodiment, the available balance can be combined with a line of credit.

As previously indicated, funds due the merchant 408 are made available to the merchant through the card 406 instead of having the financial institution 402 transfer funds to an account at another financial institution. The funds owed to the merchant 408 can thus be held by the financial institution 402. This has the advantage of increasing the financial strength and worth of the financial institution 402.

This financial system thus enables a merchant or other individual to accept financial cards such as debit cards and credit cards as payment. For example, when a cardholder presents a card as payment, the merchant can authorize the amount of the transaction using the telephone, the Internet, and the like. The financial institution that issued the card of the cardholder authorizes the transaction. After authorization, the card 406 has the amount of the transaction (less settlement fees) added to the available balance of the card 406 by the acquirer. Alternatively, the merchant may be required to wait until the transaction settles before the acquirer adds the funds to the available balance of the card 406. In this example, the funds are made available for use by the merchant as soon as they are authorized.

In another embodiment, the financial institution may examine the BIN account 410 periodically to determine when funds payable to the merchant have been authorized and then make those funds available to the merchant in the form of stored value or credit. This can occur, for example, hourly, daily, and the like. The advantage is that the funds are available before they would normally settle. In one embodiment, the available balance of the card 406 is determined by the number and amount of card transactions accepted by the merchant 408.

In alternative embodiments, the card and the associated merchant account may have certain restrictions. For example, the merchant account 404 that is linked to the card 406 may only be allowed to process a certain dollar volume of transactions for a specified period of time. The merchant account 404 and the linked card 406 may also have a limit on the amount of a particular transaction.

Because the card also has the characteristics of cards that are issued by issuers, the merchant is able to use the card just as other cardholders that have cards from other issuers use their cards. The merchant, for example, can access the available balance using an ATM. A limit may be placed, however, on the amount that the merchant can withdraw in a given transaction or over a specified period. The merchant can access the available balance at other merchants that accept the card 402 of the merchant 408 as payment. While the card 406 issued to the merchant 408 and associated with the merchant account 404 can be used by the merchant just like other financial cards such as credit and debit cards, the card 406 also has an available balance that can be increased when the merchant accepts another financial card as payment.

When the merchant accesses the available balance on the card 406 and uses the card as a typical cardholder, the financial institution 402 generates an authorization. This is done by comparing the amount of authorization request against the available balance. If the available balance is too low, then an authorization may be declined. Alternatively, the card 406 may also have a credit limit that may permit the authorization to be issued when the available balance is insufficient. Also, the available balance may be decreased by any amount that is owed by the merchant as reflected in the issuing BIN account.

FIG. 4 illustrates one example of the relationships between a financial institution, a merchant card and a merchant. In FIG. 4, the financial institution acts as both the acquirer and the issuer. However, it is possible for the acquirer and the issuer to be separate financial institutions. In addition, the acquiring BIN account 410 and the issuing BIN account 412 can also be a single BIN account.

In another embodiment, a processing entity may act as an intermediary between the issuing financial institution and the acquiring institution. The processing entity can process all transactions related to the merchant card and provide the acquiring financial institution and the acquiring institution with details relating to the various transactions.

2. Dynamically Specifying Merchant Accounts

Figure 5:
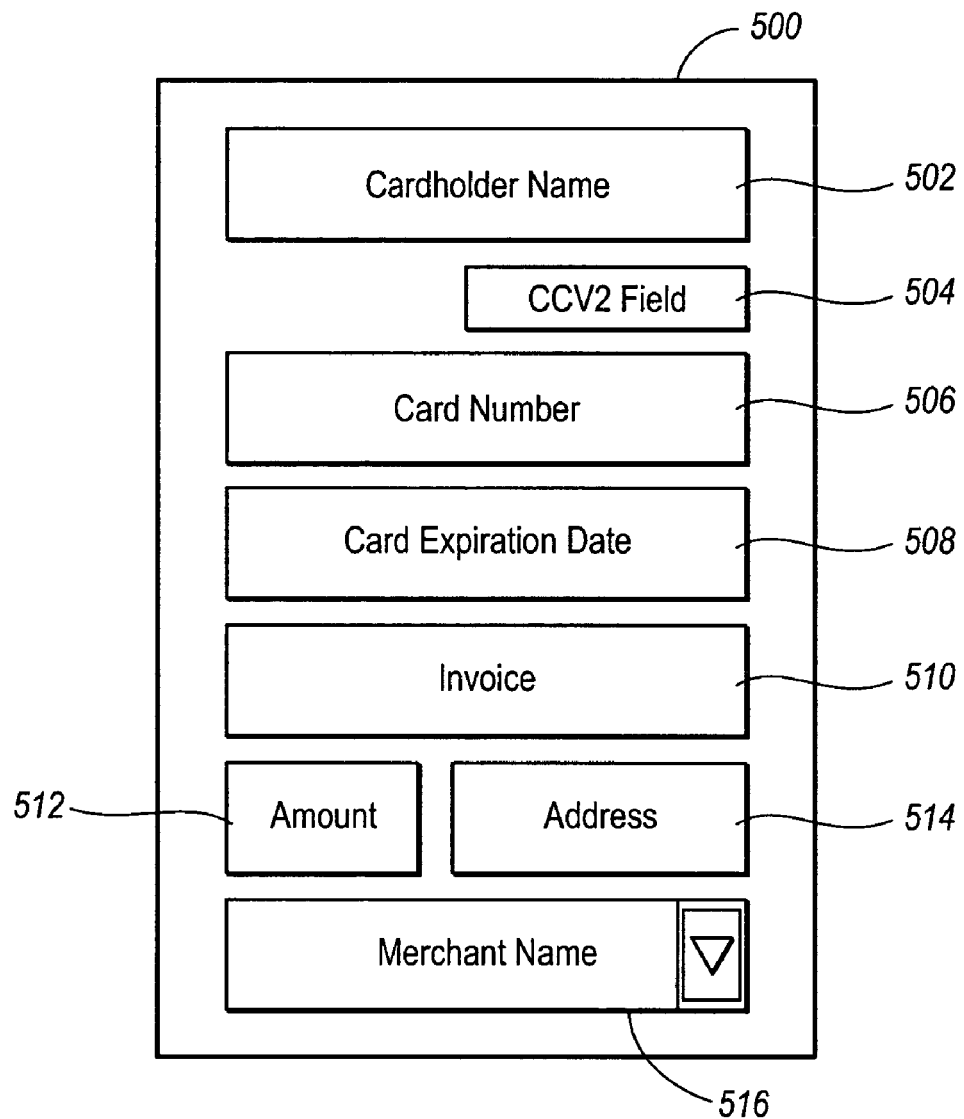
FIG. 5 is a block diagram that illustrates how a merchant can change the merchant name on a per transaction basis.

FIG. 5 is a block diagram that further illustrates the ability of a merchant to control the merchant name associated with a particular transaction. In this example, a merchant is using a merchant card to accept payment and is in the process of requesting an authorization for a card of another cardholder used to make payment to the merchant. In FIG. 5, the merchant accesses a website 500 and provides information related to the transaction and to the paying card. The merchant enters the cardholder name 502, the card number 506, the CCV2 field 504 (if necessary), the card expiration date 508, an invoice number 510, an amount 512 of the transaction, and the cardholder's address 514. The information entered for a particular transaction can vary and may be dependent on the issuer of the cardholder's card.

FIG. 5 also illustrates drop down list 516 on the website 500. In this example, the drop down list 516 permits the merchant to select a merchant name from the merchant names stored in the drop down list 516. The merchant name selected from the drop down list is associated with the transaction. The selected merchant name, for example, appears on the cardholder's statement. The merchant name can also be selected using a telephone or other mechanism.

The merchant names in the drop down list 516 were previously supplied by the merchant. Alternatively, the drop down list 516 may permit the merchant to enter a new merchant name. The merchant names in the drop down list can also be changed by the merchant as needed. This gives the merchant control over the merchant name for a given transaction. This provides a merchant with flexibility in the transactions that are conducted. For example, the merchant can receive money from a friend or accept payment for the merchant's business on the same card while reflecting a different merchant name for each transaction.

One significant benefit of this feature of the invention is that it gives the merchant a single merchant account with the ability to be used for multiple purposes, either business or personal use, while identifying each transaction appropriately to the cardholder, or payor, associated with the transaction. Thus, when the individual cardholders who have engaged in transactions with the merchant receive their monthly statements, the transactions that have been conducted with the merchant are identified in the statements using the appropriate merchant name selected by the merchant. This allows the transaction to be easily recognized by the cardholder who has received the statement. Moreover, clear identification of the merchant using one of the multiple merchant names is important, because cardholders tend to dispute transactions whose source is not readily identifiable on the cardholder statement. Thus, the source of the transaction and the identify of the merchant can be included in the statements without the need for the merchant to establish a different merchant account for each of the multiple merchant identities.

In another embodiment, the merchant account name is dynamically specified. The identity of a business entity is automatically determined based on the source of the transaction. The identity of the business entity is then included with the merchant's name in the merchant account name associated with the transaction. The correct business identity can be determined and associated with the transaction without specific input from the merchant, even where the merchant engages in transactions on behalf of more than one business entity. Furthermore, only one merchant account is required for transactions on behalf of more than one entity.

Figure 6:
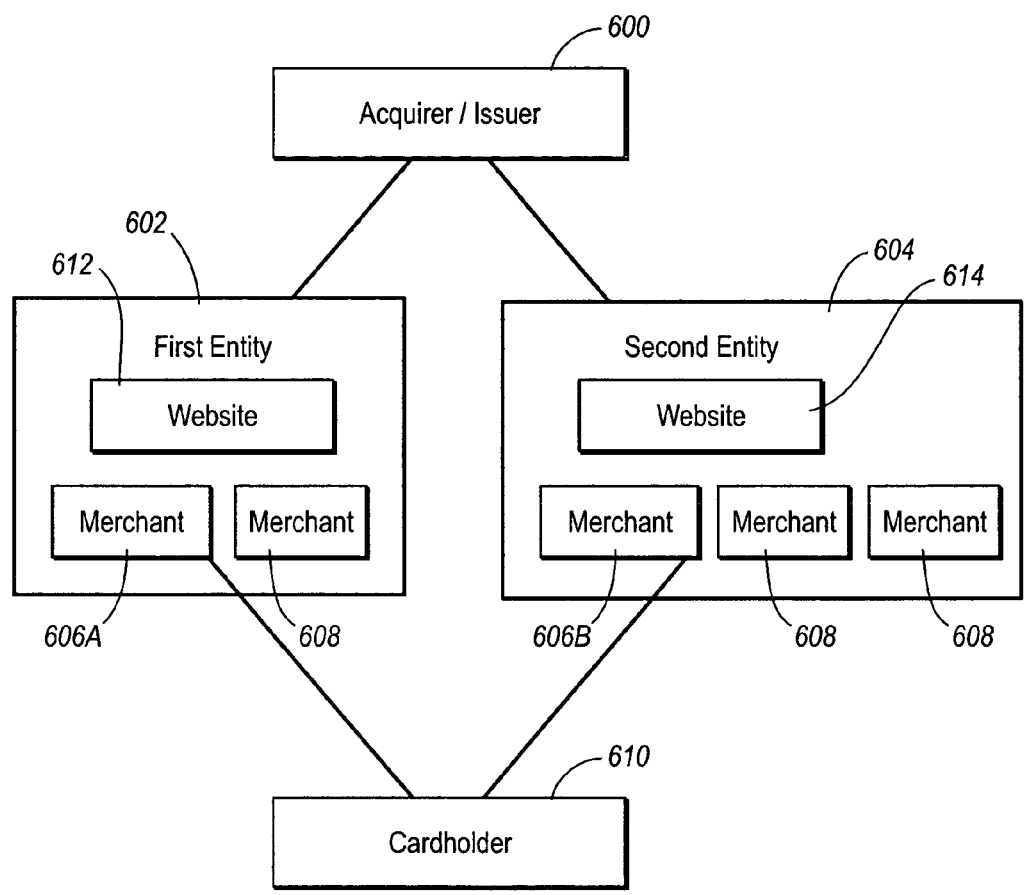
FIG. 6 illustrates the relationship between an acquirer, a cardholder, and a merchant in a system where a merchant conducts transactions on behalf of multiple business entities.

In FIG. 6, Merchant 606 is illustrated as an agent of both First Entity 602 and Second Entity 604. Thus, Merchant 606 has the authority to conduct transactions on behalf of either First Entity 602 or Second Entity 604. First Entity 602 and Second Entity 604 also have other Merchants 608 acting on their behalf. First and Second Entities 602 and 604 may have any number of merchants engaging in transactions on their behalf. Also, any particular merchant representing one entity may or may not represent the other entity. Furthermore, there is no limit to the number of entities that a single merchant can represent.

As shown in FIG. 6, First Entity 602 has a website 612 where merchants acting on behalf of First Business 602 can carry out transactions with cardholders. Second Entity 604 also has a website 614 where authorized merchants conduct transactions on behalf of Second Entity 604. Although this example illustrate dynamically selecting a merchant name over a network, the present invention can also be used in telephone systems as previously described.

Cardholder 610 engages in a transaction with Merchant 606A to purchase items from First Entity 602 using a financial card. Using the website 612, the Merchant 606A enters the relevant card information into a dialog on an Internet website 612 hosted by First Entity 602. Internet transactions using financial cards are well known. Any method of conducting such a transaction over a network can be used with the present invention. The transaction information can be transferred from First Entity 602 immediately or the information from multiple transactions may be stored and batched for transfer.

First Entity 602 then transfer's the transaction information to Acquirer/Issuer 600 for processing. According to the present invention, the identity of First Entity 602 is determined from transmittal information and included in the merchant account name associated with a particular transaction.

Transmittal information is the information in a transaction that is used to carry out the transmission. Transaction information is the information supplied by the Merchant 606A or Cardholder 610, such as credit card number, cardholder name, expiration date, or a selected merchant name. Transmittal information on the other hand includes information used to transfer the transaction information or otherwise establish a connection for the transmission of the transaction information, such as an IP address or domain name. The transmittal information may also include any other identifier, such as a unique number, that can be used to select the appropriate merchant name. In one embodiment, the transmittal information is information is not explicitly supplied by the merchant by is implicit in the transmission of the transaction information. For example, an IP address may be used to dynamically select a merchant name. However, the IP address is not explicitly provided by the merchant, but is included implicitly when the transactions are sent for processing.

When the Acquirer/Issuer 600 receives transaction information, various items of transmittal information are unique to a particular business entity. For instance, a business entity that communicates transactions over the Internet will reveal its IP address when it communicates the transaction information. The Acquirer/Issuer 600, knowing that a particular business entity owns or transfers card data from a particular IP address specifies the merchant name accordingly and associates the merchant account and/or the merchant name with transactions originating from that source.

Transmittal information is not limited to the IP address. Any data used in the transmission of a transaction that is unique to the sender can be used to identify the source of the transaction. Furthermore, the identifying information included in the merchant account name can be the name of the business or any word or name that would be helpful to identify the source or subject matter of the transaction. The identifying information may be only one portion of the merchant account name. For instance, the name of the individual merchant may be associated with the merchant account name. The merchant's name is specified by the merchant or otherwise encoded for transfer with the transaction information.

Merchant 606 also conducts a transaction with Cardholder 610 on behalf of Second Entity 604. Using Second Entity's Website 614, Merchant 606B completes a transaction by entering in relevant card data. This transaction performed on behalf of Second Entity 604 is carried out similarly to the transaction conducted on behalf of First Entity 602. However, since the transaction occurs on Second Entity's Website 614, the transmittal information will be different. For instance, the IP address will be different since the communication is from a different website. The Acquirer/Issuer 600, knowing Second Entity's IP address can then determine the proper identity and specify the name of the merchant account accordingly.

In both transactions with Entities 602 and 604, the correct business identity is associated with the merchant name and the same merchant performing both transactions does not need to specify the identity of the business entity. Furthermore, the merchant only needs to establish one merchant account. By dynamically specifying the merchant account, there is no need to establish more than one account for a particular merchant. Having only a single merchant account is advantageous because it eliminates the need to underwrite and maintain multiple accounts and eliminates the need for the merchant to use more than one card.

The present invention can also be practiced with a system other than a network. For instance, a merchant name may be dynamically specified from a transaction performed over a telephone. Dynamically specifying a merchant account name for a telephone transaction is somewhat similar to specifying a merchant account name for a network transaction. The merchant performs the transaction by calling a telephone number provided to the merchant for conducting financial card transactions. The merchant then enters the relevant transaction information using the telephone.

In the case of a telephone transaction, the telephone number is one type of transmittal information that can be used to determine the association between the business entity and the transaction. The telephone-based transaction may also be performed using an integrated voice recognition system. When using the integrated voice recognition system, transaction data is entered by giving voice responses rather than pressing numbers on the keypad.

As already mentioned, the financial card transaction can be carried out on a website over the Internet. The present invention works with all types of networks and devices. For instance, the present invention can be implemented using a local area network, wide area network, personal digital assistant, cell phone, lap top computer, or any other device or system capable of electronically transmitting financial card data.

Once the Acquirer/Issuer 600 dynamically specifies a merchant account, the name of the merchant account can be transmitted with the other transaction information. The issuer can then include the name of the merchant account on the paying cardholder's financial card statement.

Identifying the business entity is more beneficial than just identifying the merchant. Cardholders will often recognize the business entity more readily than the individual merchant. Cardholders who recognize the source of the transaction are much less likely to dispute the transaction thereby reducing system expenses. The present method also allows merchants to engage in transactions on behalf of more than one business entity without the need to specify a particular business in each transaction. Dynamically specifying the merchant account saves the merchant and other financial entities considerable time and reduces the risk of error.

When a transaction occurs between a cardholder and a merchant, the transaction information for processing a transaction is transmitted by the merchant and received by the appropriate entity for approval. The merchant name can be selected dynamically based on the source of the transaction as described above. In some instances, however, the merchant may be presented with a list from which the appropriate merchant name is selected. Selecting a merchant name also includes generating a new merchant name. This can occur before, during, or after a particular transaction. Selecting a merchant name can include selecting a merchant name from a pre-defined list, receiving input (from the merchant or the cardholder) that specifies the name, or using information obtained from an application. The merchant and/or the cardholder may also have the option of adding a note that will appear on the cardholder's statement.

While the invention has been described in light of the novel financial system of FIGS. 1-4, the methods of dynamically specifying a merchant account can also be practiced in combination with other financial systems. For example, conventional financial systems in which merchants can accept financial cards for payment can be adapted to permit merchants representing multiple business entities to engage in financial transactions in which an appropriate merchant name is selected and used to perform the transaction.

Embodiments within the scope of the present invention may be incorporated into systems. Embodiments included dedicated devices or systems that include both hardware and/or software components.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Although not required, the invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system a method of dynamically specifying a particular point of interaction (POI) identifier that is associated with a particular transaction, the method comprising:
    using a computer system associated with an organization:
        enabling by the computer system a merchant to receive financial card information from first and second POIs using a single merchant identifier stored on the computer system, wherein the first and second POIs are different from each other, associated with distinct purposes for which the single merchant identifier is used, and identified on a per transaction basis;
        receiving by the computer system financial card information for processing a first transaction between a first cardholder and the merchant from the first POI to be processed using the single merchant identifier;
        identifying by the computer system a first POI identifier having at least one portion that identifies the first POI, wherein the first POI is identified based on transmittal information for the first transaction and is not identified by the merchant;
        associating by the computer system the first POI identifier with the first transaction;
        receiving by the computer system financial card information for processing a second transaction between a second cardholder and the merchant from the second POI to be processed using the single merchant identifier;
        identifying by the computer system a second POI identifier having at least one portion that identifies the second POI, wherein the second POI is identified based on transmittal information for the second transaction and not identified by the merchant; and
        associating by the computer system the second POI identifier with the second transaction, the first and second transactions using the single merchant identifier.

2. The method of claim 1, further comprising linking by the computer system a merchant card with the single merchant identifier such that the merchant card can accept other financial cards as payment for the first and the second transaction such that an available amount of the merchant card includes the payment made by the other financial cards, wherein the single merchant identifier is a single identifier for transactions conducted on behalf of more than one POI.

3. The method of claim 1, further comprising conducting by the computer system the respective first and second transaction over a network.

4. The method of claim 3, further comprising one or more of:
    including by the computer system a network address that is associated with the particular first or second POI identifier in the transmittal information for the respective first or second transaction;
    including by the computer system an IP address or a MAC address that is associated with the particular first or second POI identifier in the transmittal information for the respective first or second transaction; and
    including by the computer system a unique value that is associated with the particular POI identifier in the transmittal information.

5. The method of claim 1, further comprising conducting by the computer system the respective first and second transaction telephonically.

6. The method of claim 5, further comprising including by the computer system a telephone number in the transmittal information for the respective first or second transaction, wherein the telephone number is associated with the particular first or second POI identifier.

7. The method of claim 5, wherein the respective first or second telephonic transaction further comprises an integrated voice recognition system.

8. The method of claim 1, wherein identifying by the computer system the selected first or second POI identifier with the respective first or second transaction further comprises including by the computer system the first or second POI identifier on the respective first or second cardholder's financial card statement.

9. The method of claim 1, wherein identifying by the computer system a first POI identifier having at least one portion that identifies the first POI further comprises one or more of:
    identifying by the computer system the first POI identifier from a pre-defined list;
    prompting by the computer system the first cardholder or the merchant to select the first POI identifier using an IVR system;
    generating by the computer system a new POI identifier that is the first POI identifier associated with the first transaction; and
    obtaining by the computer system the first POI identifier using the transmittal information included with the transaction information for the first transaction.

10. The method of claim 1, further comprising receiving by the computer system information from either the merchant or from the first cardholder that is included in the transmittal information for the first transaction and included in the first cardholder's statement, wherein the information is a note.

11. The method of claim 1, wherein the method is implemented in a computer program product having computer-executable instructions for performing the method.

12. In a computer system, a method of dynamically specifying a point of interaction (POI) identifier and a business entity that is associated with a particular transaction, the method comprising:
    using a computer system associated with an organization:
        enabling by the computer system a merchant to receive financial card information from more than one POI using a single merchant identifier stored on the computer system, wherein each POI is different and is associated with a distinct purpose for which the single merchant identifier is used, each POI being associated with a distinct POI identifier to form a pre-determined list of POI identifiers, wherein each POI can be specified on a per transaction basis;

linking a merchant card with the single merchant identifier wherein the merchant card can accept other financial cards as payment in a transaction such that an available amount of the merchant card includes the payment made by the other financial cards;

receiving by the computer system financial card information for processing a particular transaction between a cardholder and the merchant to be processed using the single merchant identifier;

identifying by the computer system a first POI identifier from the pre-determined list of POI identifiers based on transmittal information included in the first transaction information;

determining by the computer system a first business entity associated with the first transaction from transmittal information;

associating by the computer system the first POI identifier and the first business entity with the first transaction;

receiving by the computer system financial card information for processing a second transaction between a second cardholder and the merchant to be processed using the single merchant identifier, wherein the first cardholder and the second cardholder are different from each other;

identifying by the computer system a second POI identifier from the pre-determined list of POI identifiers based on transmittal information included in the second transaction information;

determining by the computer system a second business entity associated with the second transaction from transmittal information, wherein the first POI and the second POI are different from each other and are associated with distinct purposes for which the single merchant identifier may be used; and associating by the computer system the second identifier and the second business entity with the second transaction, the first transaction and the second transaction being conducted using the single merchant identifier.

13. The method of claim 12, further comprising conducting by the computer system the respective first or second transaction over a network or a telephonic system.

14. The method of claim 12, wherein receiving by the computer system financial card information for processing the first transaction further comprises at least one of:

including by the computer system a network address in the transmittal information, wherein the transmittal information is associated with the first POI identifier;

including by the computer system a unique value in the transmittal information, wherein the unique value is associated with the first POI identifier; and including by the computer system a domain name in the transmittal information, wherein the domain name is associated with the first POI identifier.

15. The method of claim 12, further comprising including by the computer system a telephone number in the transmittal information, wherein the telephone number is associated with the first POI identifier.

16. The method of claim 12, wherein receiving by the computer system financial card information for processing a first transaction between a cardholder and the merchant further comprises receiving by the computer system the first transaction information over an integrated voice system.

17. The method of claim 12, wherein receiving by the computer system financial card information for processing a first transaction between a cardholder and the merchant further comprises receiving by the computer system the first transaction information over a computer network.

18. The method of claim 12, wherein associating by the computer system the respective first or second POI identifier with the respective first or second transaction further comprises including by the computer system the respective first or second POI identifier on the cardholder's financial card statement.

19. The method of claim 12, wherein identifying by the computer system a first POI identifier from the pre-determined list of POI identifiers based on transmittal information included in the first transaction information further comprises one or more of:

selecting by the computer system the first POI identifier from a pre-defined list;

prompting by the computer system the merchant to select the first POI identifier using an IVR system;

generating by the computer system a new POI identifier that is the first POI identifier associated with the transaction; and obtaining by the computer system the first POI identifier using the transmittal information included with the transaction information.

20. The method of claim 12, wherein the method is implemented in a computer program product having computer-executable instructions for performing the method.

21. In a computer system, a method of dynamically specifying a point of interaction (POI) identifier for a transaction, the method comprising:

using a computer system associated with an organization:

enabling by the computer system a merchant to receive payment on behalf of first and second POIs using a single merchant identifier stored on the computer system, wherein the first and second POIs are different from each other, associated with distinct purposes for which the single merchant identifier is used, and specified on a per transaction basis, and wherein the payment can be received from multiple distinct cardholders;

initiating by the computer system a transaction with a first cardholder;

obtaining by the computer system approval for the transaction by sending financial card information to an issuer, wherein the financial card information includes transmittal information inputted by a merchant using a user interface capable of specifying a particular POI identifier to associate with the transaction;

identifying by the computer system a POI identifier based on the transmittal information, the transmittal information also identifying the single merchant identifier through which the issuer should obtain approval for the transaction;

associating by the computer system a business entity identified in the transmittal information with the single merchant identifier, selecting by the computer system the business entity associated with the single merchant identifier corresponding to the transaction using the transmittal information, wherein the business entity is one of two or more business entities associated with the single merchant identifier; and associating by the computer system the identified POI identifier and the business entity with the transaction.

22. The method of claim 21, further comprising linking a merchant card with the single merchant identifier, wherein:
the merchant card can accept other financial cards as payment in the transaction such that an available amount of the merchant card includes the payment made by the other financial cards.

23. The method of claim 21, wherein the transmittal information is a network address.

24. The method of claim 21, wherein associating by the computer system the POI identifier with the transaction further comprises including by the computer system the POI identifier on the first cardholder's financial card statement.

25. The method of claim 21, wherein another portion of the POI identifier is selected by the merchant from among a plurality of available POI identifiers.

26. The method of claim 21, wherein selecting by the computer system a POI identifier further comprises one or more of:
selecting by the computer system the POI identifier from a pre-defined list;
prompting by the computer system the merchant to select the POI identifier using an IVR system;
generating by the computer system a new POI identifier that is the POI identifier associated with the transaction; and
obtaining by the computer system the POI identifier using the transmittal information included with the transaction information.

27. The method of claim 21, wherein the method is implemented in a computer program product having computer-executable instructions for performing the method.

* * * * *